F. SEYMOUR.
MOTION PICTURE MACHINE.
APPLICATION FILED NOV. 4, 1918.
1,317,042.
Patented Sept. 23, 1919.
7 SHEETS—SHEET 1.
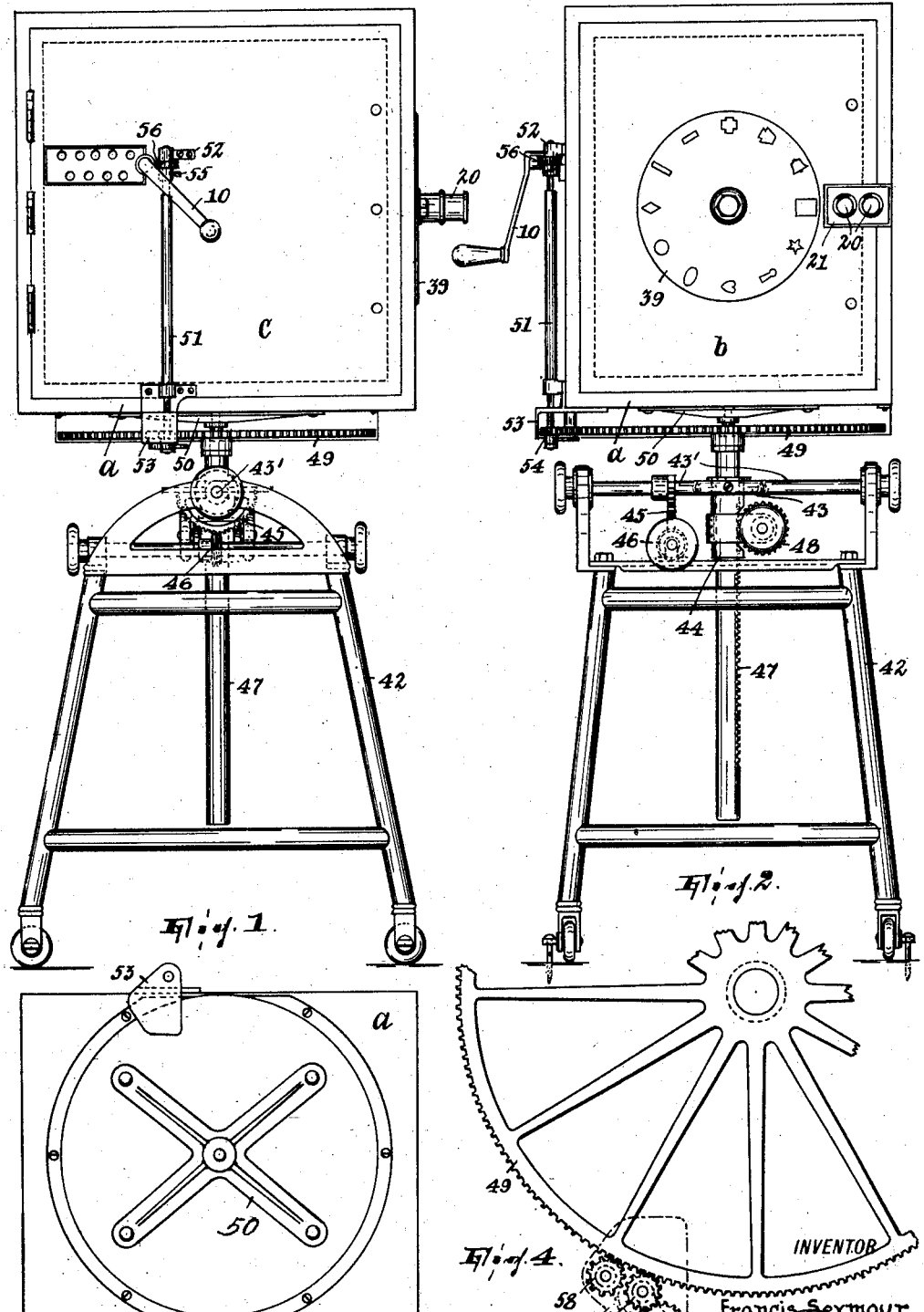

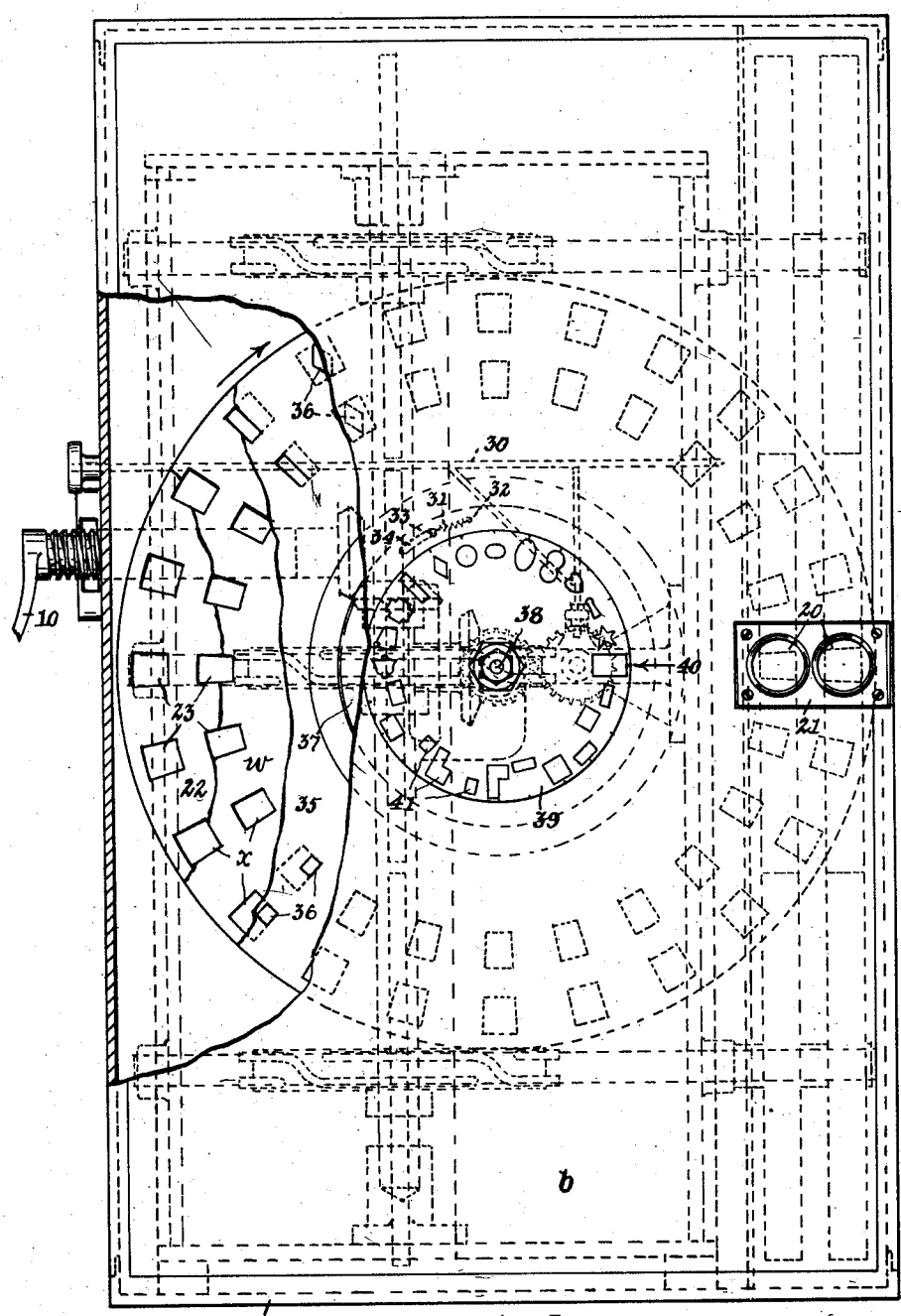

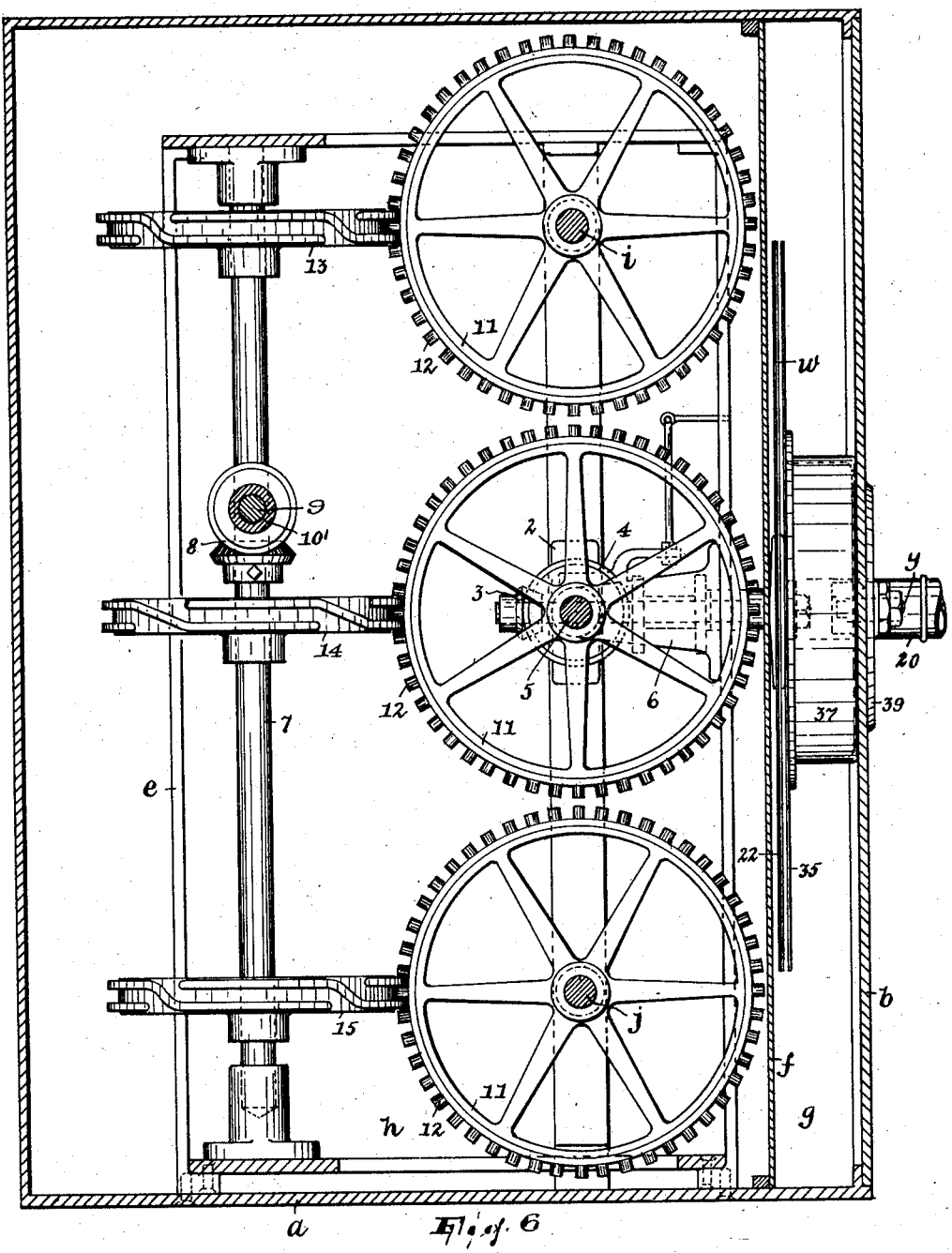

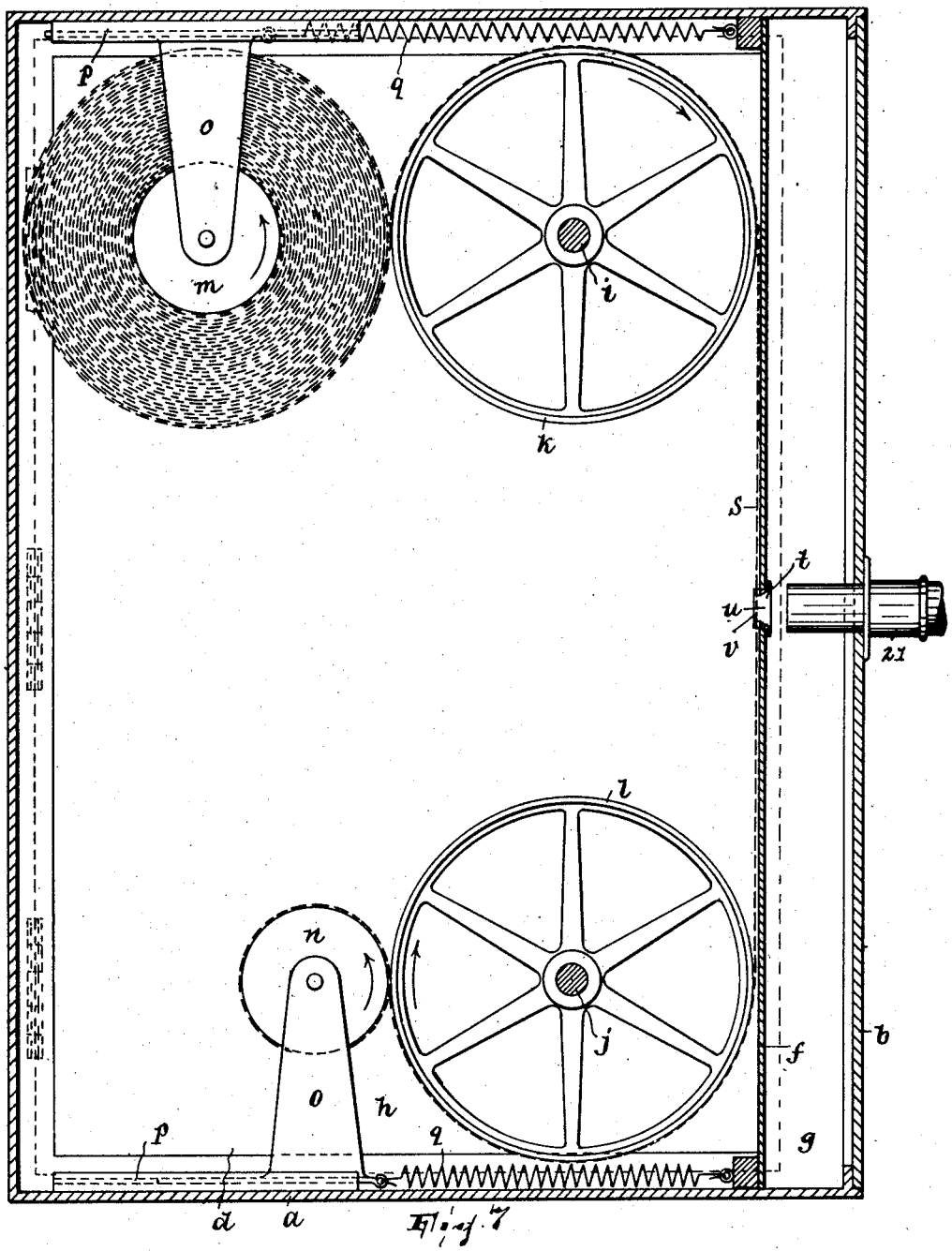

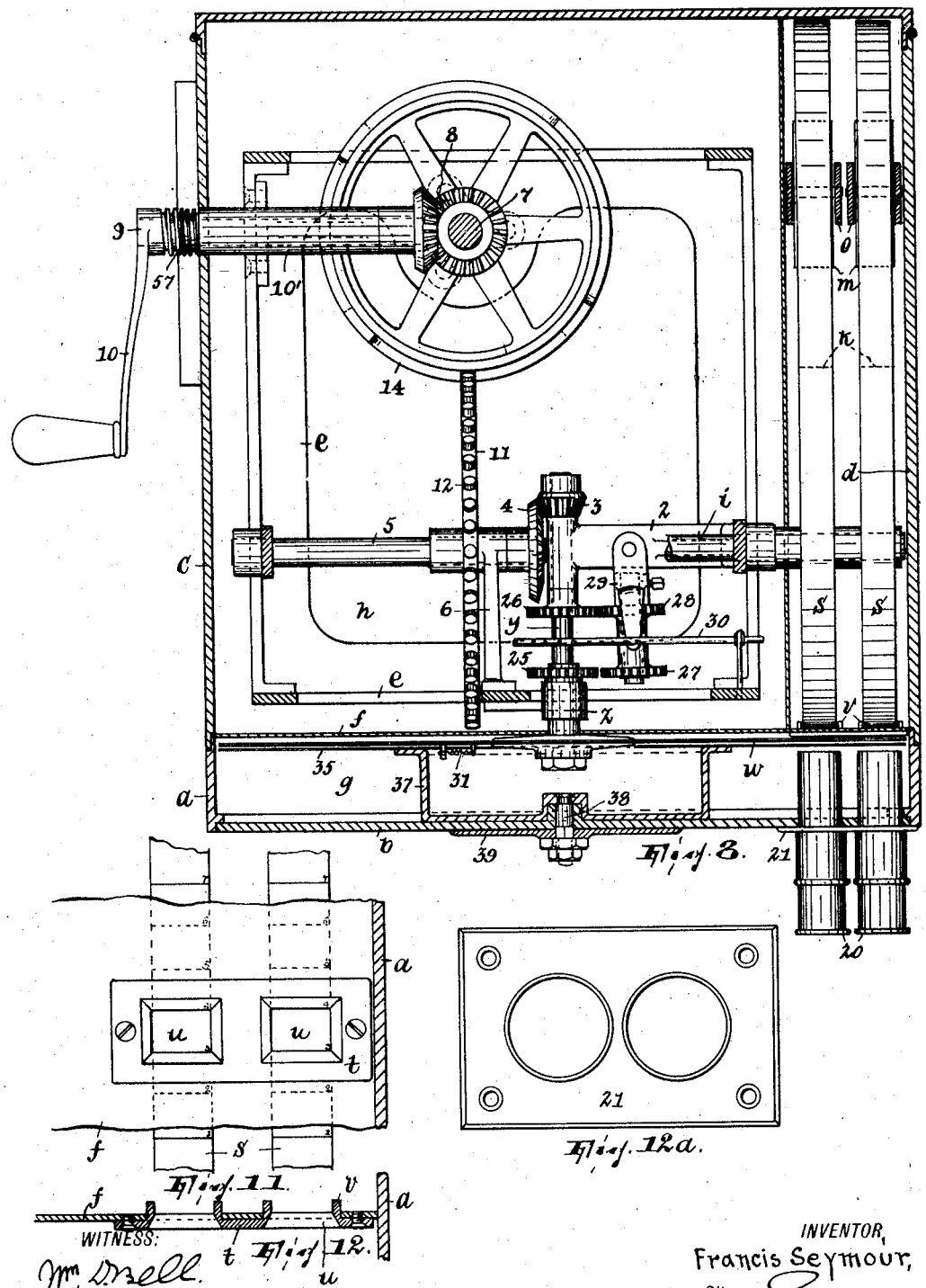

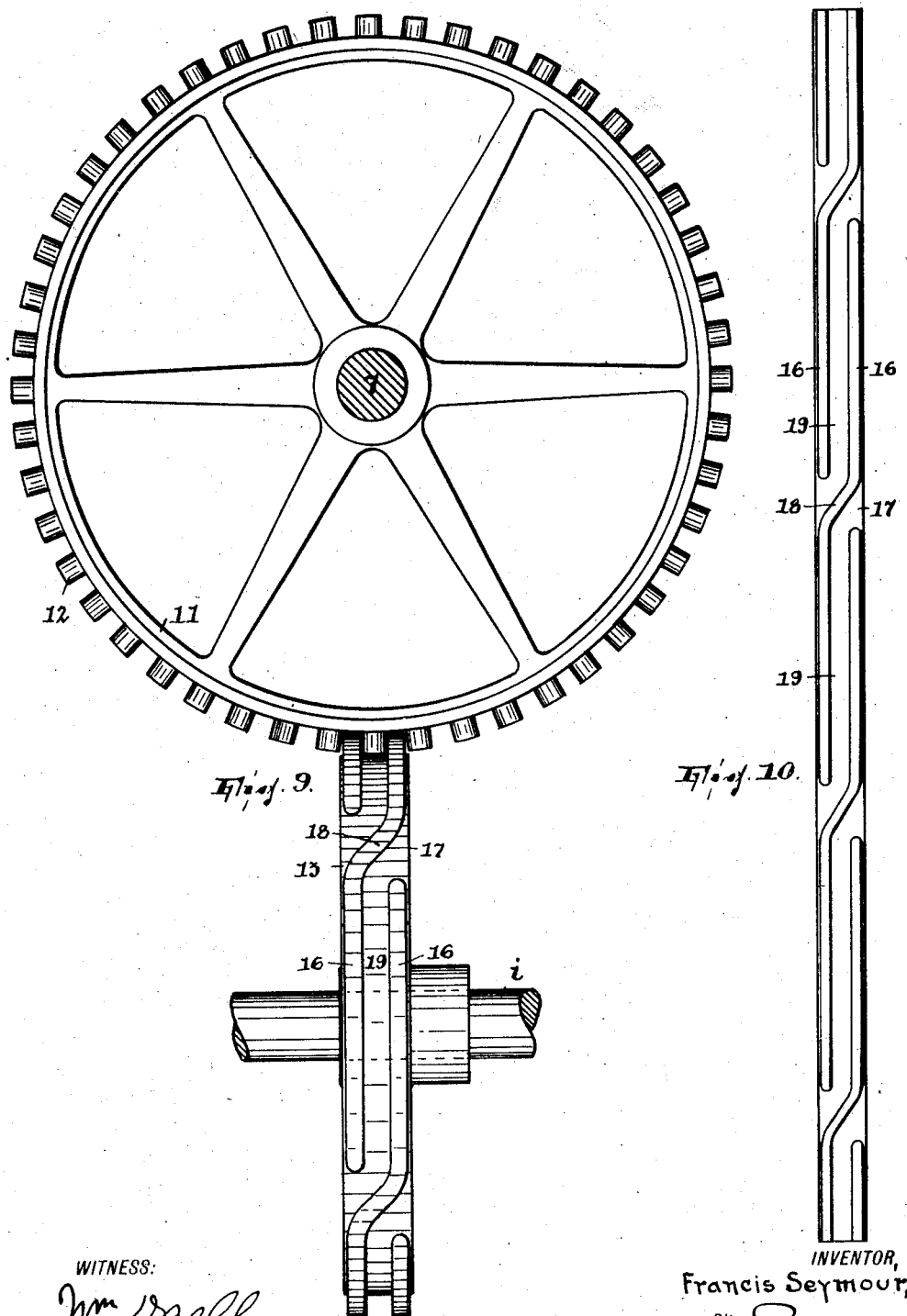

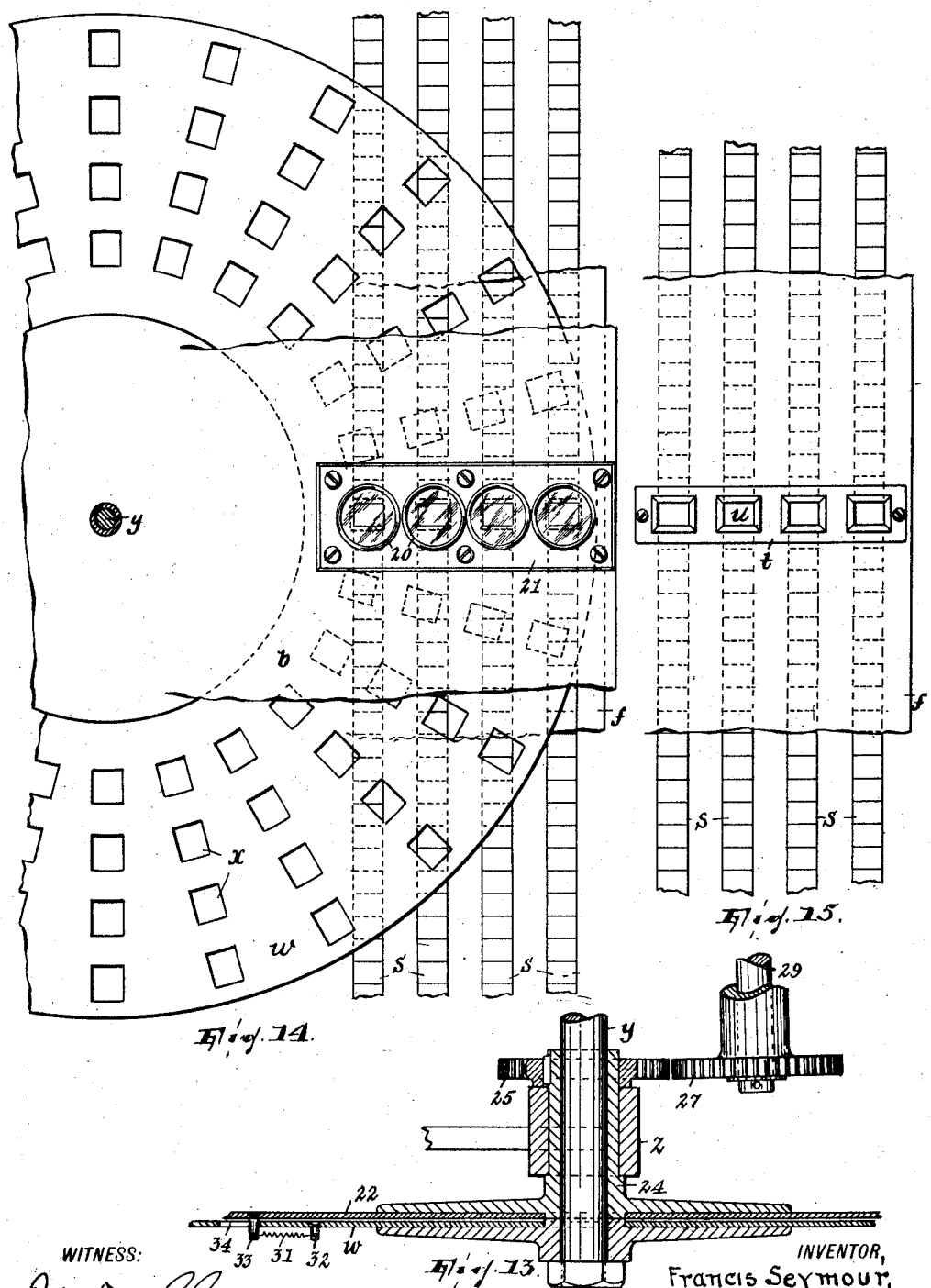

ly high rate of speed,
UNITED STATES PATENT OFFICE.

FRANCIS SEYMOUR, OF PATERSON, NEW JERSEY.

MOTION-PICTURE MACHINE.

1,317,042. Specification of Letters Patent. Patented Sept. 23, 1919.

Application filed November 4, 1918. Serial No. 260,993.

*To all whom it may concern:*

Be it known that I, FRANCIS SEYMOUR, a citizen of the United States, residing at Paterson, in the county of Passaic and State of New Jersey, have invented certain new and useful Improvements in Motion-Picture Machines, of which the following is a specification.

In ordinary moving picture machines—whether camera or projector—the film is advanced step by step and the shutter rotates continuously, the two being so synchronized that the shutter covers the film each time and so long as it is in motion but (as by an opening in the shutter) uncovers it while it is at a standstill. In view of the necessity to rapidly advance the film step by step in order to establish so-called "persistence of vision" and hence the illusion of moving pictures, it is requisite that the shutter should travel at a very high rate of speed, and this leads to the generation of static electricity or "static," which is recognized as a very serious objection, particularly in the camera, where the light incident to "static" must be kept from the sensitized film. One object of this invention is therefore to eliminate the continuously, and hence, of necessity, high-speed-moving shutter, together with the development of "static" and other objectionable incidents to the use of such a shutter. Another object is to make it possible for more than one film at a time to be operated in a single machine. These two objects I attain by employing a step-by-step moving shutter, with novel means to advance it intermittently in proper synchrony with the film or films.

Another object of the invention is to provide novel means for producing so-called dissolving "pictures," especially in connection with my step-by-step moving shutter.

Another object is to provide a novel means for advancing the film or films step by step, and novel means for effecting the take-up and delivery of the same.

Still another object is to provide a moving picture machine with novel means affecting its mounting whereby it may be variously adjusted and further used in taking or projecting panoramic pictures.

Other objects will be hereinafter pointed out.

In the accompanying drawings,

Figures 1 and 2 are side and front elevations, respectively, of the improved machine;

Fig. 3 is an underneath plan of the case;

Fig. 4 is a top plan of the panorama gearing;

Fig. 5 is a front elevation of the case partly broken away to show the shutter, in turn partly broken away to reveal the dissolving shutter.

Fig. 6 is a vertical sectional view taken in a plane between the right side wall of the case and the cams and pin-wheels;

Fig. 7 is a vertical sectional view taken in a plane between the cams and pin-wheels and the films and their take-up and delivery means;

Fig. 8 is a horizontal sectional view approximately in the plane of the main operating shaft;

Fig. 9 is an elevation of one of the cams and its pin-wheel;

Fig. 10 shows the face of one of the cams developed in a plane;

Fig. 11 is a front elevation of the films and case-apertures in a pluri-film machine;

Fig. 12 is a horizontal sectional view of what appears in Fig. 11:

Fig. 12ª shows the lens holder:

Fig. 13 is a sectional detail illustrating the main and dissolving shutter and a part of the latter's operating means; and Figs. 14 and 15 are front elevations showing, respectively, the shutter and films, and the case-apertures and films, of a multi-film machine.

The case *a* of the machine has a removable front wall *b* and two hinged side walls *c* and *d*. Suitably secured in the case is a skeleton frame *e*. Forward of this frame there is a vertical partition *f* parallel with the front wall of the case and dividing the same into a major and a minor compartment *g* and *h*.

The machine which is shown in Figs. 1 to 13 is a two-film machine—it will be obvious that it might have only one film. The films travel vertically opposite the front of the machine and at one side thereof, as adjacent the wall *d;* that is they are laterally offset with respect to the axis of the shutter, which is a disk rotating in a vertical plane and having its axis substantially centered between the side walls *c* and *d* of the case.

With their axes horizontal and parallel with the front of the case there are journaled in the frame $e$ shafts $i$ and $j$, one near the top and the other near the bottom of the case. Fixed on these shafts are the film feed-wheels $k$ $l$. Respectively back of the feed-wheels are arranged the film rollers $m$ $n$ which are journaled in identical supporting means so that a description of one of these will serve for the other. A bracket $o$ in which the film roller is directly journaled on a horizontal axis is slidable back and forward in a suitable guideway $p$ in the top (or bottom) wall of the casing, being normally impelled toward the feed-wheel by a spiral spring $q$. Each film-roller $m$ carries a film $s$ and forms a delivery roller; each film-roller $n$ constitutes a take-up roller for the film. The films $s$ extend from the delivery rollers $m$ over the feed-rollers $k$ and then under the feed-rollers $l$ to the take-up rollers $n$. Preferably, the ends of the films are in some way secured to the rollers $m$ and $n$. Between the feed-wheels $k$ and $l$ the film is held taut and parallel and close to the partition $f$. To form the exposure apertures in the partition $f$ I provide (Figs. 11 and 12) a plate $t$ having apertures $u$ and rearwardly projecting flanges $v$ flanking each of its apertures, the partition being apertured to correspond and said plate being secured against the front face thereof with its flanges protruding through the apertures in the partition and forming lateral guides for the films (see Fig. 8). In view of what will appear hereinafter, from which it will be seen that the feed-wheels $k$ $l$ are rotatively advanced at identical peripheral speeds and that in arranging the films in the machine at the outset they are required to extend around the feed-wheels and film-rollers $n$ in a taut state, and while being unwound from the film-rollers $m$ and wound up on the take-up rollers $n$ kept in that state, it will be obvious that my invention avoids one serious disadvantage in ordinary moving picture machines, to wit, the waste of film incident to the apertures usually therein for the reception of the teeth of sprocket-wheels to drive them; in the films in my machine space does not have to be reserved for sprocket holes and so the whole width of the film is available for the taking of pictures. It will be understood that in the synchronous rotation of the feed-wheels $k$ $l$ the wound packages of film on the rollers $m$ and $n$ are held by the springs $q$ pressing against the peripheries of the feed-wheels.

The disk $w$ forming the plate or shutter (I shall hereinafter refer to the main shutter as the "shutter") has in each of a suitable number of equidistant radial lines two apertures $x$, the same being positioned so that as the shutter is rotated step by step a pair of such apertures will each time be brought into registry with the light apertures $u$. The shutter is arranged in the compartment $g$ close to the front face of the plate $t$ and is secured on a horizontal shaft $y$ arranged substantially centrally between the two sides of the casing and journaled in brackets $z^2$ attached to the frame $e$ (Fig. 8). It carries a beveled pinion 3 which meshes with a beveled pinion 4 on a horizontal shaft 5 journaled in the frame $e$ and a bracket 6 in the same vertical plane as and midway between the shafts $i$ and $j$.

7 is a vertical shaft (the main shaft) journaled in the frame $e$ back of the shafts $i$, $j$ and 5. Through bevel gearing 8 this shaft is driven from a horizontal shaft 9 carrying a crank 10 and journaled in a bracket 10′ attached to the frame $e$.

The shutter, it will be seen, has not only one exposure aperture in a circular path around its axis (as is usually the case) but a number of them; in fact, in the construction being described there are a number of these apertures to each of two such circular paths. Hence, according to the theory of my machine, the shutter rotates intermittently or step-by-step. In order, therefore, to synchronize the step-by-step movement of the shutter with the step-by-step advances of the film so that the shutter will through the exposure apertures expose the films when the latter are at a standstill and obscure the same when they are in motion, I employ the following transmission means between the drive shaft 7 and the shafts $i$, 5, $j$: Fixed on the shafts $i$, 5, $j$ are the pin-wheels 11 in the present instance all alike in respect to the diameter and the number of peripheral pins 12 thereon. Fixed on the shaft 7 are three cams 13, 14 and 15 respectively coöperating with the pin-wheels on the shafts $i$, 5 and $j$. Each cam is divided into equal peripheral and similar cam portions as indicated in Fig. 10, which shows the periphery of one of the cams 13 or 15 developed in a plane. That is, each portion includes a pair of parallel spaced ribs 16 extending longitudinally of the periphery of the cam, such pairs being separated by a break 17 excepting as to an oblique rib 18 which connects one end of the right-hand rib of one pair with the adjoining end of the left-hand rib in the next succeeding pair. The effect is to form the periphery of the cam with a succession of camways 19, which at their ends are diverted respectively right and left but between their ends extend longitudinally of the periphery of the cam, so that assuming one of the pin wheels to be engaged with such a cam as shown in Figs. 6 or 9 and the cam to be rotated continuously the pin-wheel will be alternately rotated and held at dwell. It is desirable that as to the shutter's movements it should have a slight lead and follow with respect to the films so as to insure as perfect "cover" as possible while the film is moving. Hence, while the cam 14 for the shutter has in the present case the same diameter as the cams 13 and 15, I prefer to decrease the length of its ribs 16 and correspondingly increase the length of its oblique ribs 18 which of course involves also less degree of obliqueness of the latter (see Fig. 6). In the present case there are four cam portions to each cam, and the cams are so arranged that as to every one of four radial planes 90° apart such plane would be coincident with a point exactly midway of the length of the two ribs 16 of each of the three cams 13, 14 and 15; wherefore it will be seen that when the shaft 7 is in rotation the films and shutter will respectively advance and rotate step by step, both being at dwell at the same time and in rotation at the same time, though, as explained, the shutter has a slight lead and follow for each of its movements with respect to the films. In the present case, the shaft 7 is designed to rotate at say 240 revolutions per minute; this will give 20 revolutions per minute of the pin-wheels and 40 revolutions per minute of the shutter, the gearing 4—3 being in the ratio of 2 to 1.

The picture areas or surfaces (which I find it convenient to number consecutively 1, 2, 3, etc.,) are indicated by transverse lines on the films in Fig. 11—see also Figs. 14 and 15. As the films are moved step by step to effect placements of these picture surfaces successively in registry with the light apertures $u$ movements of the shutter (each starting a little before and ending a little after each corresponding movement of the films) occur to effect placements of its exposure apertures in registry with the light aperture, these movements and intervening placements or dwells being caused by the dwell-motion mechanism characterized by the set of cams and pin-wheels described.

Figs. 14 and 15 show the shutter $w$ having a multiplicity (four) of exposure apertures $x$ in each radial line and a corresponding number of films. The great advantage obtained by employment of two or more exposure apertures in each radial line of the film, with two or more films, especially where the machine operates as a camera, will be appreciated by those skilled in this art. This advantage is impossible of attainment in ordinary moving picture machines where the exposure aperture in the shutter must of necessity (since the shutter rotates continuously) be many times as large as the surface of film actually subject to exposure, instead of approximately the same size, according to my invention.

The lenses 20 are mounted in a holder 21 secured to the front wall of the case opposite the apertures $u$.

For obtaining so-called "fade-away" or dissolving pictures I provide the dissolving shutter 22, which is a disk arranged face to face with and back of the main shutter and having apertures 23 corresponding in disposition, number and form with those ($x$) of the main shutter. This disk is mounted on a sleeve 24 (which affords the actual bearing for shaft $y$ in bracket $z$) carrying a pinion 25. Shaft $y$ carries a pinion 26. Respectively adapted to mesh with the pinions 25 and 26 are the pinions 27 and 28 rotative together and journaled in an arm 29 fulcrumed in the bracket 2 and having attached thereto an operating rod 30 which protrudes at one side of the case within convenient reach of the operator. The gearing 25, 29, 30, 26 is of such ratio that there results a slight difference in speed, when the train is established, between 25 and 26, in consequence of which the dissolving shutter gradually assumes obstructing relation to the exposure apertures of the main shutter. For dissolving the operator pulls out the rod 30 to establish the train of gearing, leaving the parts in that position for that predetermined number of exposures which corresponds to full obscuration of the apertures of shutter $w$ by shutter 22, whereupon he pushes the rod in, breaking the gearing train; thereupon, under the tension of a spring 31 connecting a pin 32 on one shutter with a pin 33 on the other (movable in a slot 34 in the former, see Figs. 5 and 13) the dissolving shutter springs to normal position—with its apertures registering with those of the main shutter.

It is frequently desired to obtain so-called vignette pictures. To this end my machine includes a vignetting disk 35 disposed concentrically with and close to and forward of the main shutter and having arbitrarily shaped holes 36 corresponding in number and disposition to the exposure apertures of the main shutter. This disk has a forwardly projecting cup-shaped hub 37 which is suitably secured to the inner end of a short shaft 38 journaled in front wall $b$ of the case in alinement with the axis of the main shutter, the forward end of which has secured thereto a dial 39 revoluble with reference to the fixed pointer 40 on the case and provided with figures 41 radially corresponding with and respectively of the same shape as the vignetting holes 36 of disks 35. By turning the dial the operator can set the vignetting disk so that a vignetting hole of the same shape as the figure 41 which is made to register with the pointer opposes each exposure aperture $u$.

In Figs. 1 and 2 is shown a carriage 42 in which are journaled the long trunnions 43' of a yoke 43 in which is secured a depending sleeve or guide 44. On one of the trunnions of the yoke is a worm wheel 45 and meshing therewith, journaled in the carriage, is a worm 46 provided with suitable handles for turning it. In the guide 44 is arranged a rack 47 with which a pinion 48 on the guide meshes, the same being equipped with suitable handles for turning it and so elevating or depressing the rack. The upper end of the rack has fixed thereto a large gear wheel or circular rack 49 and in its top is swiveled a spider 50 secured to the base of case *a*. It will be understood that by turning worm 46 and pinion 48 the inclination and the elevation of the machine may be changed at will.

For taking panorama pictures a reversing and disconnective connection between shaft 9 and the circular rack 49 is provided, thus: A vertical shaft 51 is journaled in the brackets 52, 53 secured to the same side of the case from which the crank 10 projects, and it carries at its lower end a pinion 54 and at its upper end, releasably secured thereon by the set-screw 55, the worm-wheel 56 which meshes with a worm 57 on the shaft 9. Pinion 54 forms part of a reversing train including a pinion 58, journaled in bracket 53 and permanently in mesh with the circular rack, and a pinion 59 permanently in mesh with pinion 54 but journaled in a handle 60 (pivoted concentrically with pinion 54) so as to mesh either with the circular rack or pinion 58. Ordinarily the set-screw is released so that the worm-wheel 56 turns idly thereon; but when panorama pictures are to be taken the set-screw is turned up against the shaft in consequence of which rotation of shaft 9 not only operates the interior mechanism of the machine but causes it to turn on its swivel in the rack 47, the operator from time to time effecting reversal of its turning movement by shifting with his free hand the handle 60.

Having thus fully described my invention, what I claim as new and desire to secure by Letters Patent is:—

1. A moving picture machine including, in combination with a case having a light aperture, a series of picture surfaces to be successively placed opposite said aperture, means to effect such placements, and a shutter to intercept the light passing through such aperture between placements, dwell-motion means to actuate the shutter, including rotary driving and driven members, one being a cam and the other having an annular series of pins successively engageable with the cam.

2. A moving picture machine including, in combination with a case having a light aperture, a series of picture surfaces to be successively placed opposite said aperture, means to effect such placements, and a shutter to intercept the light passing through such aperture between placements, means to actuate the shutter including a driven rotary pin-wheel and a driving rotary cam journaled within the case, said cam having alternating cam portions extending respectively at right angles and oblique to the axis of the cam and engaged by the pin-wheel.

3. A moving picture machine including, in combination with a case having a light aperture, a series of picture surfaces to be successively placed opposite said aperture, and means to intercept the light passing through said aperture between such placements, dwell-motion means to actuate both said series of picture surfaces and the light-intercepting means comprising sets of rotary driving and driven members, one member in each set being a cam and the other a pin-wheel having an annular series of pins successively engageable by said cam.

4. A moving picture machine including, in combination with a case having a light aperture, a series of picture surfaces to be successively placed opposite said aperture, and a shutter to intercept the light passing through said aperture between such placements, means to actuate both the shutter and said series of picture surfaces including driven rotary pin-wheels journaled within the case and respectively appertaining to said shutter and series, a shaft journaled within the case, and cams on the shaft engaged by the pin-wheels.

5. A moving picture machine including, in combination with a case having a light aperture, a series of picture surfaces to be successively placed opposite said aperture, and a shutter to intercept the light passing through said aperture between such placements, means to actuate both the shutter and said series of picture surfaces including driven rotary pin-wheels journaled within the case and respectively appertaining to said shutter and series, a shaft journaled within the case, and cams on the shaft engaged by the pin-wheels, said cams approximately conforming to one another in shape and disposition.

6. A moving picture machine including a case having an aperture for a light beam, an intermittently movable series of picture surfaces to be successively placed opposite said aperture, an intermittently movable shutter plate movable in a plane through the light beam and having means to allow the light beam to pass therethrough on each dwell thereof, and means to cause alternate movements together and dwells together of said series and the shutter.

7. A moving picture machine including a case having an aperture for a light beam, an intermittently movable series of picture surfaces to be successively placed opposite said aperture, an intermittently movable shutter plate movable in a plane through the light beam and having means to allow the light beam to pass therethrough on each dwell thereof, and means to cause alternate movements together and dwells together of said series and the shutter, each movement of the shutter beginning before and ending after the corresponding movement of said series.

8. A moving picture machine including, in combination with a case having a light aperture, a series of picture surfaces to be successively placed opposite said aperture, and means to intercept the light passing through said aperture between such placements, two dwell-motion means respectively adapted to actuate said series of pictures and the light-intercepting means, the latter having dwells of shorter duration than the former and gearing connecting and synchronizing said dwell-motion means.

9. A moving picture machine including a case having apertures for a plurality of light beams, a plurality of series of picture surfaces to be successively placed opposite said apertures, means to effect such placements of surfaces of the respective series, a shutter common to said apertures and having means to allow said light beams to pass simultaneously therethrough, and means to actuate the shutter in synchronism with said means.

10. A moving picture machine including a case having apertures for a plurality of light beams, a plurality of series of picture surfaces to be successively placed opposite said apertures, means to effect such placements of surfaces of the respective series, a disk-like rotary shutter common to said apertures and having in concentric lines exposure apertures registrable with said light apertures, exposure apertures in different lines radially coinciding with each other, and means to actuate the shutter in synchronism with said means.

11. A moving picture machine including, in combination with a case having a light aperture, a series of picture surfaces to be successively placed opposite said aperture, and means to intercept the light passing through said aperture between such placements, including a main shutter having an exposure aperture registrable with the light aperture, a dissolving shutter coupled to move with but also movable relatively to the main shutter and having an opening registrable with the aperture of the main shutter, a yielding connection between said shutters, means to drive the main shutter and means, disconnectively connected with said driving means, to move the dissolving shutter at a speed different from that of the main shutter.

12. A moving picture machine having a light-aperture, in combination with a disk journaled within the case and arranged in a plane intercepting the light through said aperture and having a concentric series of differently shaped vignette openings to register with the same, said disk having an exposed dial provided with a concentric series of symbols corresponding in shape and radial disposition to the vignette openings and readable with reference to a definite point on said case.

In testimony whereof I affix my signature.

FRANCIS SEYMOUR.

Copies of this patent may be obtained for five cents each, by addressing the "Commissioner of Patents, Washington, D. C."